United States Patent [19]

Lewis et al.

[11] 4,413,078

[45] Nov. 1, 1983

[54] LIGHT-STABLE POLYOLEFINS

[75] Inventors: Elyse B. Lewis, Williamstown, W. Va.; Leo L. Valdiserri, Belpre, Ohio

[73] Assignee: Borg-Warner Chemicals, Inc., Parkersburg, W. Va.

[21] Appl. No.: 375,946

[22] Filed: May 7, 1982

[51] Int. Cl.$^3$ .......................... C08K 5/13; C08K 5/52

[52] U.S. Cl. .............................. 524/120; 252/400 A; 252/404; 524/336

[58] Field of Search ............................ 524/120, 336; 252/400 A, 404

[56] References Cited

U.S. PATENT DOCUMENTS

| | | | |
|---|---|---|---|
| 3,039,993 | 6/1962 | Friedman | 524/120 |
| 3,188,298 | 6/1965 | Williamson et al. | 524/151 |
| 3,737,485 | 6/1973 | Hechenbleikner | 524/120 |
| 3,988,293 | 10/1976 | Mills . | |
| 4,302,383 | 11/1981 | Valdiserri et al. | 524/120 |
| 4,305,866 | 12/1981 | York et al. | 524/120 |

FOREIGN PATENT DOCUMENTS 1526603 9/1978 United Kingdom .

*Primary Examiner*—John Kight, III
*Assistant Examiner*—R. A. White
*Attorney, Agent, or Firm*—Joseph Shekleton

[57] ABSTRACT

An olefin polymer composition having improved stability to deterioration resulting from exposure to ultraviolet radiation. The enhanced stability results from the effective presence of a combination of an organic phosphite ester and a hydroxybenzophenone.

8 Claims, No Drawings

LIGHT-STABLE POLYOLEFINS

This invention relates to an improved polymer composition. More particularly, it relates to olefin polymer compositions which are stabilized by the presence of a combination of an organic phosphite ester and a hydroxybenzophenone.

BACKGROUND OF THE INVENTION

In recent years olefin polymers have found extensive use in the preparation of a wide variety of products many of which come into contact with food products. It is well known that exposure to sunlight or other sources of ultraviolet light cause the degradation of olefin polymers. Such degradation is shown by a loss in the molecular weight of the polymer, by the development of color, and by a decrease in such physical properties as tensile strength to the point of mechanical failure. This type of degradation has in the past been dealt with by the incorporation in the polymer composition of certain additives which are effective to inhibit it.

U.S. Pat. No. 3,988,293 (Mills) deals with a stabilizer system for polyolefins. Polypropylene compositions are shown which contain stabilizing proportions of 2-hydroxy-4-n-octoxybenzophenone and distearyl pentaerythritol diphosphite. Such compositions are shown to be resistant to breakage upon flexing, after prolonged exposure in a Weather-Ometer at 180°.

U.K. Pat. No. 1,526,603 shows a process for preparing certain mixed aryl aliphatic phosphites, i.e., phosphites wherein the phosphorus atom(s) is linked through oxygen both to aromatic and aliphatic groups. The use of these phosphites as thermal stabilizers likewise is shown. Polypropylene compositions containing bis-(2,4-ditertiarybutyl) pentaerythritol diphosphite and the corresponding 2,6-ditertiarybutylphenyl isomer are shown to be relatively stable after four extrusions at 475° C., a fifth extrusion at 525° C. and heating of a 25-mil. thick sample at 150° C. until failure.

SUMMARY OF THE INVENTION

The invention of this application is a light-stable olefin polymer composition comprising in combination an olefin polymer and minor proportions sufficient to improve the light-stability of said olefin polymer of each of (a) a hydroxybenzophenone having the structure

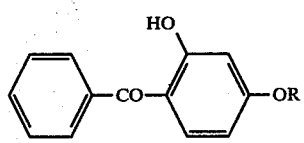

where R is an alkyl group of 1–10 carbon atoms, and (b) a bis-(dialkylphenyl)pentaerythritol diphosphite where the alkyl groups each contain 3–9 carbon atoms. The combination of these additives is especially effective to inhibit the deterioration normally attendant upon exposure to ultraviolet light.

DESCRIPTION OF PREFERRED EMBODIMENTS

The amounts of these additives which should be used in the olefin polymer compositions may range for each such additive, from about 0.01% to about 0.5%, based on the weight of the polymer composition. A preferred range, because of optimum effectiveness, is from about 0.08% to about 0.25%.

The olefin polymers contemplated herein include homopolymers and copolymers of monoolefins, preferably those monoolefins containing 1–4 carbon atoms. Illustrative examples include polyethylene (including low density, high density, ultra high molecular weight and linear low density polyethylene), polypropylene, EPDM polymers, ethylene-propylene copolymers and polyisobutylene. The stabilization of mixtures of any of these olefin polymers and copolymers likewise is contemplated.

The hydroxybenzophenone preferably is the one in which R in the above structural formula is n-octyl, i.e., 2-hydroxy-4-n-octoxybenzophenone. This group R, however, may, as indicated, be any alkyl group having 1–10 carbon atoms, and all such hydroxybenzophenones are contemplated herein. Illustrative R groups include methyl, ethyl, n-propyl, 2-methylbutyl, 2-ethylhexyl, decyl and isodecyl groups.

The bis-(dialkylphenyl)pentaerythritol diphosphite are those in which the alkyl groups each have as indicated 3–9 carbon atoms. Preferably these are bulky groups, i.e., either secondary or tertiary alkyl groups. Such alkyl groups include isopropyl, sec-butyl, tertiarybutyl, n-amyl, tertiaryamyl, n-hexyl 2,2-dimethylbutyl, 2-methyl-2-ethylpropyl, tertiarynonyl.

The two alkyl groups are in the 2,4-positions or 2,6-positions. A particularly preferred species is bis-(2,4-ditertiarybutylphenyl)pentaerythritol diphosphite. Another preferred species is bis-(2,6-ditertiarybutylphenyl)pentaerythritol diphosphite.

The pentaerythritol of the present invention may be prepared in accordance with the process described in U.K. Pat. No. 1,526,603. That process is a transesterification requiring the reaction, for example, of a dialkylphenol with diphenyl pentaerythritol diphosphite, phenol being split out as a by-product. The reaction is carried out at elevated temperatures and proceeds best with a basic catalyst.

The hydroxybenzophenones herein may be prepared by the reaction of benzotrichloride with resorcinol in an aqueous acidic environment, to yield the expected 2-hydroxybenzophenone, which then is etherified with an alkyl chloride such as octyl chloride in an alkaline medium to give the 2-hydroxy-4-n-octoxybenzophenone.

The hydroxybenzophenones of the present invention are known to impart good ultraviolet stability to polymer compositions. The bis-(dialkylphenyl)pentaerythritol diphosphites, on the other hand, are known principally for their effectiveness as thermal stabilizers and not for any ultraviolet stability which they may impart to polymers. The invention here is based on the unexpected performance, with respect to stabilization of olefin polymers against deterioration normally attendant upon exposure to ultraviolet light, of the combination of additives described above.

Other well-known additives may of course be used in the polymer compositions of the invention. These include neutralizers such as metal oxides and metal salts of higher molecular weight carboxylic acids, e.g., calcium stearate, barium laurate, zinc palmitate, zinc abietate and the like; phenolic oxidation inhibitors such as those described in U.S. Pat. Nos. 3,285,855; 3,644,482; 3,531,483; and various fillers, pigments, etc.

The efficiency of these polymer compositions is shown by data obtained from Weather-Ometer testing using a xenon arc as a source of ultraviolet radiation.

Opaque test samples (3"×2"×30 mils) are prepared by compression molding and suspended by clamps in an enclosed atmosphere at 110° F. For 20 minutes of each hour of the test period a thin spray of water is applied to the samples to simulate rainfall.

The test samples are removed from the Weather-Ometer at 100-hour intervals and inspected. The appearance of a crazed surface is taken as a failure of the sample and the number of hours elapsing from the beginning of the test until failure is a measure of the stability of the sample.

The data from such test is shown in Table I. The samples each were 100.75 parts of high density polyethylene (HDPE) containing the additives herein, as shown

TABLE I

|  | Sample Nos. | | | | | |
| --- | --- | --- | --- | --- | --- | --- |
|  | 1 | 2 | 3 | 4 | 5 | 6 |
| A* | — | 0.25 | — | — | 0.125 | 0.125 |
| B** | — | — | 0.125 | — | 0.125 | — |
| C*** | — | — | — | 0.125 | — | 0.125 |
| Rating | 600 | 1800 | 900 | 1500 | 1800 | 3300 |

*2-Hydroxy-4-n-octoxybenzophenone
**Distearyl pentaerythritol diphosphite
***Bis-(2,4-ditertiarybutylphenyl)pentaerythritol diphosphite It will be seen that Sample No. 6, representing the invention, clearly is superior in its ultraviolet stability to Sample No. 5 which is the composition shown in U.S. Pat. No. 3,988,293 (Mills). Moreover, an analysis of all the data above shows the unexpected synergism of the combination of additives of the invention.

Additional test data also showing the efficacy of the polymer compositions herein are set out in Table II. The data is collected from tests carried out on 200/16 denier natural polypropylene multifilament. The fiber compositions are prepared by dry blending the various components and then extruding the mixture at 475° F. Fibers are spun at 540° F., drawn at a ratio of 7:1 and given one twist per inch. The test consists of exposure of the test fiber to conditions of ordinary weather in the Caribbean. The tenacity retention of the fibers is monitored and when 50% of the original tenacity is lost the sample is adjudged a failure.

TABLE II

|  | A | C | Kilolangleys to Failure |
| --- | --- | --- | --- |
| 1. | — | — | 43 |
| 2. | 0.15 | — | 65 |
| 3. | — | 0.15 | 48 |
| 4. | — | 0.30 | 58 |
| 5. | 0.15 | 0.15 | 93 |

It will be noted that Sample No. 5 representing the invention, is more stable then Sample No. 4 which contains twice as much of bis-(2,4-ditertiarybutylphenyl)-pentaerythritol diphosphite as does Sample No. 5.

All parts and percentages herein, unless otherwise expressly stated, are by weight.

We claim:

1. A light-stable olefin polymer composition comprising in combination an olefin polymer and minor proportions sufficient to improve the light-stability of said olefin polymer of each of (a) a hydroxybenzophenone having the structure

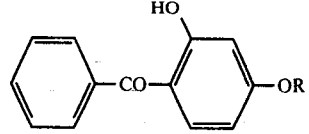

where R is an alkyl group of 1–10 carbon atoms, and (b) a bis-(dialkylphenyl)pentaerythritol diphosphite where the alkyl groups each contain 3–9 carbon atoms.

2. The light-stable olefin polymer composition of claim 1 wherein R in the hydroxybenzophenone structure is octyl.

3. The light-stable olefin polymer composition of claim 1 wherein the bis-(dialkylphenyl)pentaerythritol diphosphite is a bis-(2,4-dialkylphenyl)pentaerythritol diphosphite.

4. The light-stable olefin polymer composition of claim 1 wherein the alkyl groups in the bis-(2,4-dialkylphenyl)pentaerythritol diphosphite are bulky groups.

5. The light-stable olefin polymer composition of claim 4 wherein the alkyl groups are tertiarybutyl groups.

6. A polymer-stabilizing composition comprising in combination (a) a hydroxybenzophenone having the structure

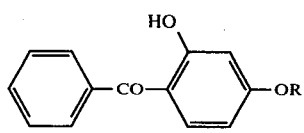

where R is an alkyl group of 1–10 carbon atoms, and (b) a bis-(dialkylphenyl)pentaerythritol diphosphite where the alkyl groups each contain 3–9 carbon atoms.

7. The polymer-stabilizing combination of claim 6 wherein R of the hydroxybenzophenone is octyl.

8. The polymer-stabilizing combination of claim 6 wherein the bis-(dialkylphenyl)pentaerythritol diphosphite is bis-(2,4-ditertiarybutylphenyl)pentaerythritol diphosphite.

* * * * *